United States Patent
Buisker et al.

(10) Patent No.: US 7,372,061 B2
(45) Date of Patent: May 13, 2008

(54) METHOD AND SYSTEM FOR DETECTING THE POSITION OF AN EDGE OF A WEB

(75) Inventors: Raymond A. Buisker, Madison, WI (US); Andrew Kalnajs, Madison, WI (US)

(73) Assignee: Accuweb, Inc., Madison, WI (US)

( * ) Notice: Subject to any disclaimer, the term of this patent is extended or adjusted under 35 U.S.C. 154(b) by 97 days.

(21) Appl. No.: 11/406,048

(22) Filed: Apr. 17, 2006

(65) Prior Publication Data
US 2007/0241293 A1    Oct. 18, 2007

(51) Int. Cl.
*G01N 21/86* (2006.01)
(52) U.S. Cl. .................... 250/559.36; 73/601
(58) Field of Classification Search ............ 250/559.01–559.49; 73/601
See application file for complete search history.

(56) References Cited

U.S. PATENT DOCUMENTS

| | | | |
|---|---|---|---|
| 3,724,958 A | 4/1973 | Callan | |
| 4,110,627 A | 8/1978 | Isherwood | |
| 4,555,633 A | 11/1985 | Björkelund | |
| 4,559,451 A | 12/1985 | Curl | |
| 4,559,452 A * | 12/1985 | Igaki et al. | 250/559.36 |
| 5,072,414 A | 12/1991 | Buisker et al. | |
| 5,274,573 A | 12/1993 | Buisker et al. | |
| 5,834,877 A * | 11/1998 | Buisker et al. | 310/322 |
| 5,932,888 A | 8/1999 | Schwitzky | |
| 6,175,419 B1 | 1/2001 | Haque et al. | |
| 6,323,948 B2 | 11/2001 | Haque et al. | |
| 7,075,099 B2 | 7/2006 | Buisker et al. | |
| 2007/0241293 A1* | 10/2007 | Buisker et al. | 250/559.36 |

* cited by examiner

Primary Examiner—Thanh X. Luu
Assistant Examiner—Tony Ko
(74) Attorney, Agent, or Firm—Brinks Hofer Gilson & Lione

(57) ABSTRACT

A method and system for determining the lateral position of an edge of a web are disclosed. The system includes a plurality of optical transmitters, a plurality of optical receivers, a plurality of ultrasonic transmitters, a plurality of ultrasonic receivers, and a controller. The controller is used to determine which type of transmitter and receiver should be used in conjunction with the specific web to be processed. The controller activates certain optical transmitters and determines the amount of optical occlusion that results from the web being between the optical transmitters and receivers. The controller also activates certain ultrasonic transmitters and determines the amount of sound occlusion that results from the web passing between the ultrasonic transmitters and receivers. The type of transmitter/receiver that results in the most occlusion can then be selected to determine the position of the edge of the web. Once selected, only one type of transmitter/receiver is preferably used at a given time to determine the position of the edge of the web, and position the web accordingly. A compensation beam can also be used to further enhance the accuracy of the determination of the web's position.

48 Claims, 2 Drawing Sheets

METHOD AND SYSTEM FOR DETECTING THE POSITION OF AN EDGE OF A WEB

FIELD OF THE INVENTION

The present invention relates generally to guiding a moving web and more particularly to a system and method for determining the position of an edge of a web.

BACKGROUND

Many different types of materials including fabric, paper, films, foils, and the like are formed into what is commonly known as a web. In the production, processing, or treatment of a web, the web is often moving as it progresses from one operation, such as cutting, slitting, printing, and the like, to the next operation. It is important to be able to accurately determine the position of the web as it moves so that it can be properly aligned for the various operations.

One commonly known technique for determining the position of a moving web involves detecting the position of the physical edge of the web using an ultrasonic edge detector. Another commonly known technique for determining the position of a moving web involves detecting the position of the physical edge of the web using a light-based edge detector. Despite the advantages of these types of detectors, there are shortcomings associated with both of them. Ultrasonic detectors are only effective for determining the position of certain types of materials. While ultrasonic detectors work well with many types of materials, and in particular, materials that are transparent or translucent such as thin paper sheets or transparent plastic, they do not work well with other materials, such as non-woven fabric and mesh. Similarly, while light-based detectors work well with certain types of materials, they do not work well with other types of materials, mainly those that are transparent or translucent. Thus, each of the ultrasonic and light based detectors works well with some types of materials, but neither works well with all types of materials.

In addition, the determination of which detector type is best suited for a given application is made by a person whose decision may or may not be based upon the actual performance of the different types of detectors and whose decision may or may not result in the selection of the optimum detector for a given application.

Further, in order to switch from one type of detector to another, a person is required to physically remove the existing detectors and replace them with another type of detector. This process is time consuming and labor intensive.

A system and method for determining the position of an edge of a web that overcome these deficiencies are needed.

DETAILED DESCRIPTION OF THE PRESENTLY PREFERRED EMBODIMENTS

Figure 1:
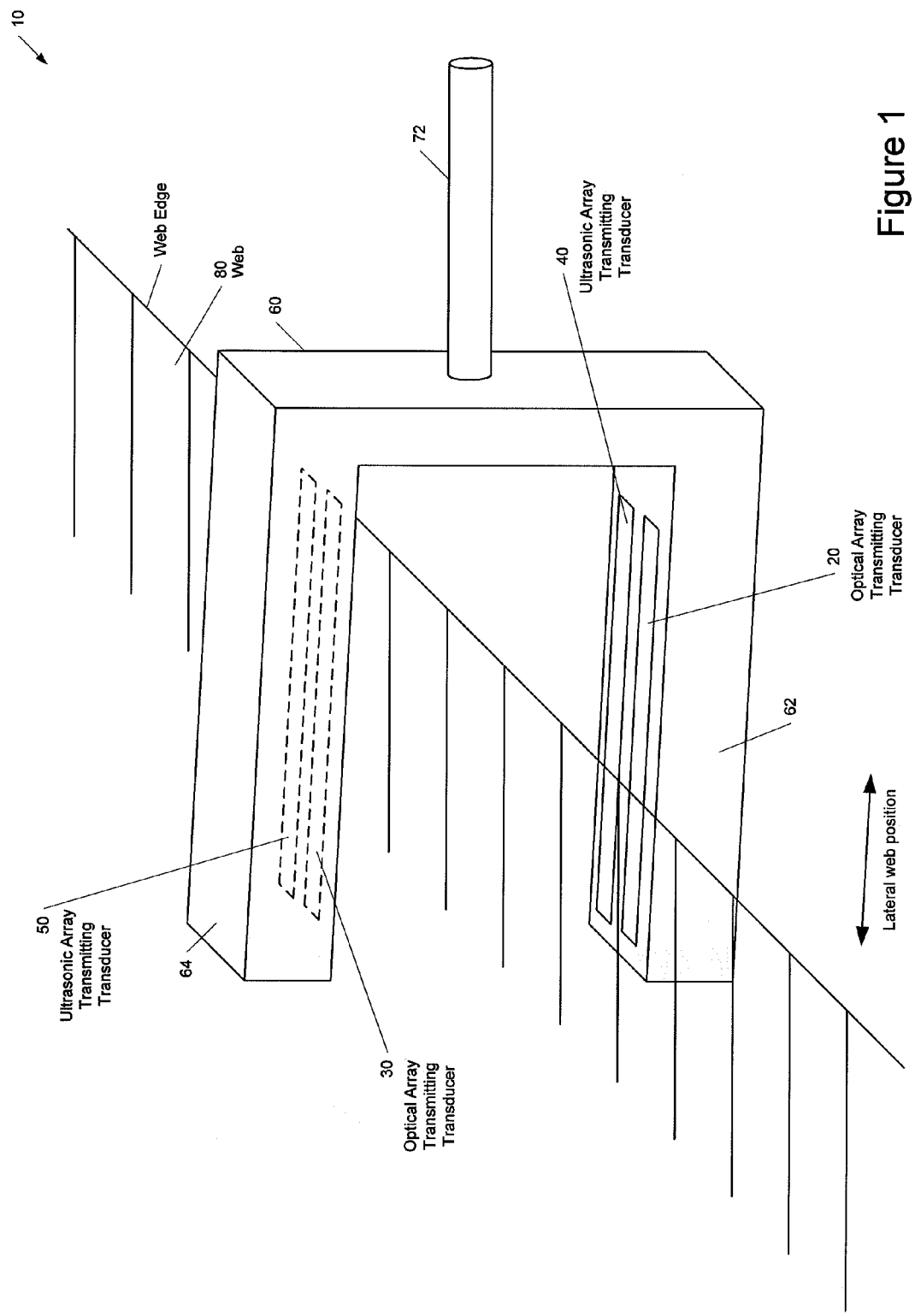
FIG. 1 is a perspective view of an edge detector assembly of a preferred embodiment.

By way of introduction, the preferred embodiments described herein include systems and methods for determining the position of an edge of a web or sheet of material in a manufacturing or converting process. In one embodiment, a plurality of optical sources or transmitters are configured to transmit optical energy, preferably in the form of a light beam, that can be received by a plurality of optical receivers to sense the position of a web. Each of the optical transmitters is paired with an optical receiver, and the optical transmitters and optical receivers are located on opposite sides of the web plane near the edge of the web. Likewise, a plurality of ultrasonic sources or transmitters are configured to transmit ultrasonic energy, preferably in the form of a sound beam, that can be received by a plurality of ultrasonic receivers to sense the position of a web. Each of the ultrasonic transmitters is paired with an ultrasonic receiver, and the ultrasonic transmitters and ultrasonic receivers are located on opposite sides of the web plane near the edge of the web.

In typical use and operation, the web passes between the optical transmitters and the optical receivers and between the ultrasonic transmitters and the ultrasonic receivers. When the web passes between the transmitters and the receivers, typically, it will occlude some of the light beams generated between the optical transmitters and the optical receivers and it will also occlude some of the sound beams generated between the ultrasonic transmitters and the ultrasonic receivers. Typically, some of the light beams and some of the sound beams will fully occluded, some of them will be partially occluded, and some of them will not be occluded.

A controller is preferably used to determine which type of transmitter and receiver should be used in conjunction with the specific web to be processed. The controller activates certain optical transmitters and determines the amount of optical occlusion that results from the web being present between the optical transmitters and receivers. The controller also activates certain ultrasonic transmitters and determines the amount of sound occlusion that results from the web being present between the ultrasonic transmitters and receivers. The type of transmitter/receiver that results in the most occlusion can then be selected for use in determining the position of the edge of the web. Once selected, only one type of transmitter/receiver is preferably used at a given time to determine the position of the edge of the web, as described below.

After the type of transmitter/receiver has been selected, the controller can also be used to determine the position of the edge of the web and control the position of the edge of the web via a web mover. The controller can sequentially activate one of the transmitting elements and the corresponding receiving elements so that a light beam or sound beam is generated between the activated transmitting element and the activated receiving element. For the light/sound beams that are partially occluded, the amount of energy striking the receiving element will be reduced, in proportion to the amount of occlusion, as compared to an un-occluded light/sound beam. The receiving elements, in turn, each generate a signal that is proportional to the amount of energy striking it. Since the amount of occlusion is influenced by the position of the web's edge with respect to a reference point, the signal generated by the receiver assembly will also be proportional to the amount of occlusion and thus the position of the edge of the web. The controller can determine the position of an edge of the web in response to the signal generated by the receivers and can control or alter the position of the edge of the web. In addition, a compensation light/sound beam can be employed to enable the controller to compensate for several factors that can affect measurement accuracy.

The resulting system is compact in design and enables the position of the edge of the web, no matter what the construction, to be accurately determined.

Figure 2:
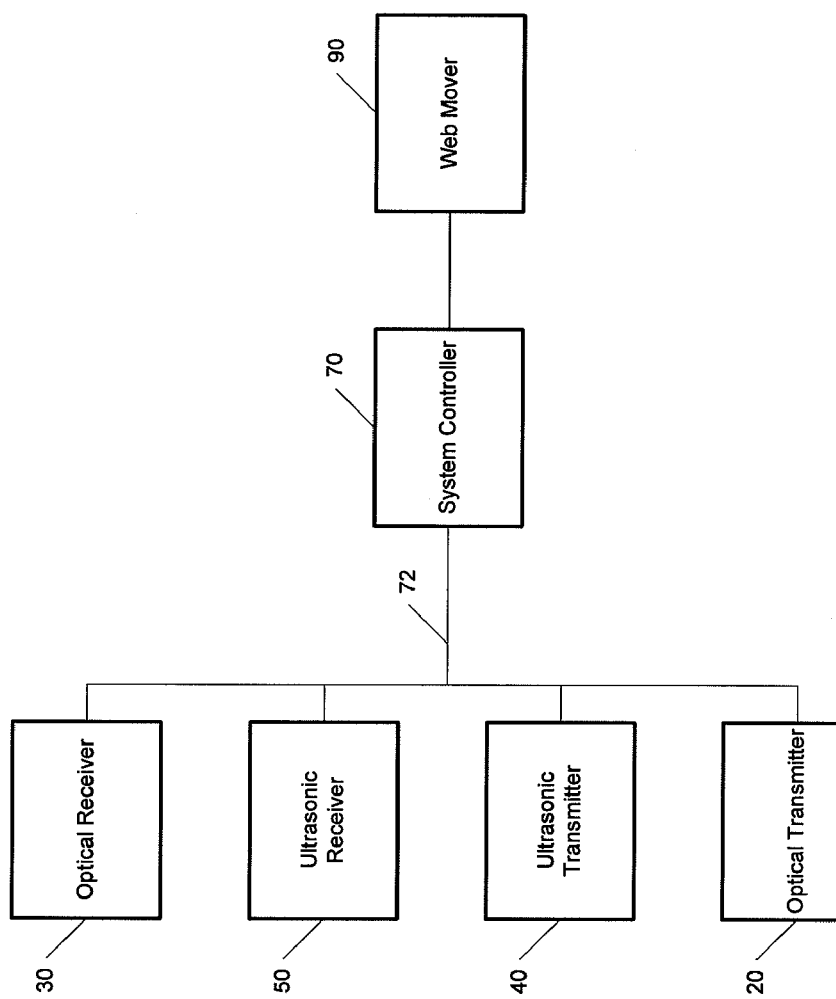
FIG. 2 is a block diagram of an edge detector assembly of a preferred embodiment.

By way of example, FIGS. 1 and 2 depict an edge detector assembly 10 of a preferred embodiment. The edge detector assembly 10 comprises an optical transmitter assembly 20, an optical receiver assembly 30, an ultrasonic transmitter assembly 40, an ultrasonic receiver assembly 50, a housing 60, and a system controller 70.

The optical transmitter assembly 20 and the optical receiver assembly 30 preferably comprise one of the types of such assemblies disclosed in pending U.S. patent application Ser. No. 10/358,987, Publication No. 20040149940, which is hereby incorporated by reference. The ultrasonic transmitter assembly 40 and the ultrasonic receiver assembly 50 preferably comprise one of the types of such assemblies disclosed in U.S. Pat. No. 5,834,877, which is hereby incorporated by reference.

As described in U.S. patent application Ser. No. 10/358, 987, Publication No. 20040149940 and U.S. Pat. No. 5,834, 877, the preferred embodiments of the assemblies 20, 30, 40, 50 comprise array transducers that are constructed from multiple point-source transmitter or receiver elements arranged in a linear pattern to form a transducer with a sensing area larger than that of its constituent elements. To ensure overlap between the sensing ranges of adjacent elements, the preferred pattern of transmitting and sensing elements consists of two parallel rows of closely-spaced elements, with the second row longitudinally displaced relative to the first by a distance equal to one half its element-to-element spacing. This pattern is preferably used for each of the transmitting and sensing assemblies 20, 30, 40, 50.

In the preferred design, the transducers or assemblies 20, 30, 40, 50 are mounted side-by-side within the housing 60 so that the first element of the optical transducer is adjacent to the first element of the ultrasonic transducer, and so on. Since the transmitter and receiver assemblies 20, 30, 40, 50 (transducers) face each other, the receiver's elements are arranged in a pattern that is a mirror image of the transmitter's pattern. With this arrangement used for both the optical and ultrasonic transmitting and receiving assemblies, the resulting optical and ultrasonic pairs will ideally provide identical readings of web position across the entire span of their sensing areas.

The mechanical construction, electronic circuit configuration, and software algorithm for the optical and ultrasonic assemblies 20, 30, 40, 50 (transducers) are very similar. The main differences are in the mechanical construction of the assemblies 20, 30, 40, 50 (transducers). As previously noted, the sensing area, spacing, and arrangement of the transmitter and receiver elements are identical. However, as described in U.S. patent application Ser. No. 10/358,987, Publication No. 20040149940 and U.S. Pat. No. 5,834,877, the constituent parts of the different types of assemblies 20, 30, 40, 50 (transducers) are different. The optical assemblies preferably include infrared-emitting diodes (transmitter only), photodiode receivers (receiver only), a spacer/lens holder, fresnel lenses, a visible light filter/protective window, and a diffuser (transmitter only). The ultrasonic assemblies preferably include piezoelectric ceramic elements, a spacer, and an epoxy-glass foam acoustic matching layer, which acts as a sound conducting plate. Every optical and ultrasonic assembly also preferably includes a printed circuit board that serves as the substrate for an electronic interface circuit. In addition, this PC board preferably serves as a mounting substrate for the infrared-emitting diodes and photodiode receivers in the optical assemblies.

The transmitting PC boards also preferably include an interface circuit that performs the following functions in response to control signals originating from the system controller: decodes a transmitter selection address; selects a transmitter; pulses the selected transmitter; rectifies and regulates an internal supply voltage; and illuminates a status indicator. The optical and ultrasonic transmitter interface circuits are substantially identical except for portions that directly connect to the infrared-emitting diodes and piezoelectric ceramic elements.

The receiving PC boards preferably include an interface circuit that performs the following functions in response to control signals originating from the system controller: decodes a receiver selection address; selects a receiver; connects the selected receiver to a signal amplifier; transmits the amplified receiver signal back to the system controller; and rectifies and regulates an internal supply voltage. The optical and ultrasonic receiver interface circuits are substantially identical except for portions that directly connect to the photodiodes and piezoelectric ceramic elements.

The housing 60 is preferably "U" shaped and includes a lower arm 62 and an upper arm 64 with a gap between the arms 62, 64. The optical transmitter assembly 20 is preferably disposed in the lower arm 62 and the optical receiver assembly 30 is preferably disposed in the upper arm 64, but the location of the two assemblies can be reversed. Similarly, the ultrasonic transmitter assembly 40 is preferably disposed in the lower arm 62 and the ultrasonic receiver assembly 50 is preferably disposed in the upper arm 64, but the location of the two assemblies can be reversed. The preferred "U" shape of the housing 60 enables a portion of the web of material 80 to pass through the gap between the lower arm 62 and the upper arm 64. The preferred size of the gap between the lower arm 62 and the upper arm 64 can range from less than one inch to over four inches in width. However, larger gaps can also be used, depending upon the application.

The lower and upper arms 62, 64 are preferably made in lengths that range from less than one inch to over twenty inches long to accommodate the expected range of lateral web movement. However, other longer lengths can also be made. The housing 60 is preferably constructed from aluminum, but any suitable material, including stainless steel, other metals, plastics, and composites can be used. In an alternative configuration, suitable for very long edge detectors that lack sufficient mechanical rigidity to be self-supporting, the housing can be formed so that it is closed at both ends. Use of this configuration is limited to webs narrower than the distance between the end supports. In further alternative embodiments, housings of varying shapes and sizes can be used and one or more housing sections can be used. For example, the different transmitter and receiver assemblies 20, 30, 40, 50 30 can be disposed in two or more separate housings that are not connected. A black anodized coating is preferably applied to all surfaces of the housing 60 to protect the housing 60 from corrosion and to absorb stray light.

A system controller 70 is preferably coupled with the edge detector assembly 10 by way of a cable 72 or other communication link to facilitate communication of control and measurement information, as explained in more detail below. A cable link can be supplied in lengths up to several hundred feet depending on the relative locations of the edge detector assembly 10 and the system controller 70. The preferred cable link comprises three sets of twisted pair wires, as described in U.S. patent application Ser. No. 10/358,987, Publication No. 20040149940 and/or U.S. Pat. No. 5,834,877. Alternatively, other communication links, such as fieldbus networks, including CAN bus and DeviceNet, Radio Frequency (RF), Infrared, and Microwave communications links can be used to enable communication between the system controller 70 and the edge detector assembly 10. Some examples of suitable system controllers are the Micro 1000 and Micro 4000 NET, presently available from the assignee of this application, AccuWeb, Inc.

In general, the system controller 70 can transmit control signals to the optical transmitter assembly 20, the optical receiver assembly 30, the ultrasonic transmitter assembly 40, and the ultrasonic receiver assembly 50 to control the activation of transmitter and receiver assemblies 20, 30, 40, 50, as described in more detail below. The system controller 70 can receive a data signal from each of the receiver assemblies 30, 50 and can analyze the data signals to determine which type of transmitter and controller are best suited for use with the present web material. The system controller 70 can also analyze the data signals to determine the position of the edge of the web, as described in more detail in U.S. patent application Ser. No. 10/358,987, Publication No. 20040149940 and U.S. Pat. No. 5,834,877. The system controller 70 preferably comprises a microcontroller that is responsive to a software program, as described in more detail in U.S. patent application Ser. No. 10/358,987, Publication No. 20040149940 and/or U.S. Pat. No. 5,834,877. However, any suitable controller, microprocessor, or processor, as known to those skilled in the art can be used. Also, the system controller 70 can be one or more than one component, as the functionality of the controller can be distributed among several components in the system.

The system controller 70 preferably implements software for controlling the operation of the edge detector assembly 10. One portion of the software is dedicated to calibration of the transmitting and receiving elements as described in U.S. patent application Ser. No. 10/358,987, Publication No. 20040149940 and U.S. Pat. No. 5,834,877. In the present embodiments, a software algorithm is preferably included in the detector calibration routine that is used to determine which detector to use for guiding the web.

This portion of the calibration routine preferably involves calculating the opacity level of the web material twice, once using the optical transmitter and receiver 20, 30 and once using the ultrasonic transmitter and receiver 40, 50. This is accomplished by sampling a transmitter-receiver pair that is completely covered by the web 80. The web's opacity is inversely related to the amount of energy that passes through it during the measurement. Low energy levels corresponds to high opacity (less transparent), and high energy levels correspond to low opacity (more transparent).

In the preferred embodiment, the measured energy level for a given transmitter-receiver pair can be converted to scaled number, such as from 0-255, where 0 represents the least amount of energy and 255 represents the greatest amount of energy. (The amount of energy that represents the 255 number can be calculated by taking a completely unblocked reading of the amount of energy received by the optical and ultrasonic receivers.) The scaled numbers from the optical and ultrasonic transmitters and receivers can be compared to make the selection of the transmitter-receiver type that will be used for guiding the web. In the preferred embodiment, the transmitter-receiver type that generated the lowest reading can be selected for further use. In an alternative embodiment, the measured energy levels can be converted to a calculated opacity, such as a percentage of occlusion by dividing the scaled number by 255, multiplying that number by 100 and subtracting the resulting number from 100. In a preferred embodiment, all of these calculations are performed by the system controller 70. In an alternative embodiment, the raw energy levels received by the receivers can be used in determining which type of the transmitter-receiver will be used for guiding the web. In a further alternative embodiment, the measured energy level, the scaled number, and/or the opacity percentage can be displayed on the system controller 70.

In the presently preferred embodiment, the calibration procedure requires the equipment operator to take some initial measurements with the web not occluding any of the transmitter-receiver pairs and then move the web 80 so that it completely covers the first transmitter-receiver pair and then press a button to initiate the opacity measurement. In other embodiments this second part of this process could occur automatically while the system is guiding the web by periodically sampling two transmitter-receiver pairs (one in each transducer) that are completely covered by the web.

After sampling the covered optical and ultrasonic beams the calibration routine then compares the two opacity levels, as described above, and selects the type of transmitter and receiver that yielded the highest opacity. The chosen combination is then used for guiding the web (and the other is put into an idle state) until the calibration routine is initiated again. In the alternative embodiment described above, the opacity measurement, opacity comparison, and transmitter/detector selection could occur continuously so that the optimum combination is always selected for guiding the web.

The system controller 70 preferably communicates with the optical transmitter assembly 20, the optical receiver assembly 30, the ultrasonic transmitter assembly 40, and the ultrasonic receiver assembly 50 by way of a digital pulse train, such as the one shown in FIG. 9 of U.S. patent application Ser. No. 10/358,987, Publication No. 20040149940, to control the activation and deactivation of the individual optical/ultrasonic sources and the individual optical/ultrasonic receivers, as well as the intensity of the light/sound beams generated by the optical/ultrasonic sources. This enables the optical/ultrasonic sources to be sequentially activated, one at a time, so that the transmitter-receiver pairs can be sequentially interrogated to determine the position of the edge of the web, as described in U.S. patent application Ser. No. 10/358,987, Publication No. 20040149940 and U.S. Pat. No. 5,834,877.

During operation, the signal generated by the selected receiver assembly 30 or 50 is indicative of the position of the edge of the web and is used by the system controller 70 to determine the position of the edge of the web, as described in U.S. patent application Ser. No. 10/358,987, Publication No. 20040149940 and U.S. Pat. No. 5,834,877. Also, the system controller 70 preferably interfaces with a web mover 90 so that the position of the web can be dynamically altered or moved, as necessary, as described in U.S. patent application Ser. No. 10/358,987, Publication No. 20040149940 and U.S. Pat. No. 5,834,877, and as known in the industry. Some examples of suitable web movers are the AccuGuide guide mechanisms, such as the steering roll assemblies, the positive displacement guides, and the shifting base guide assemblies, presently available from the assignee of this application, AccuWeb, Inc.

As described in U.S. patent application Ser. No. 10/358, 987, Publication No. 20040149940 and U.S. Pat. No. 5,834, 877, the system 10 can compensate for several factors that can affect measurement accuracy. These factors include environmental temperature and humidity, the. presence of gas, smoke, or particulate matter, as well as contaminant build-up on exterior surfaces of the transducers and temperature and age induced drift in the optical/ultrasonic sources, optical/ultrasonic receivers, control circuits, and signal processing circuits. The compensation technique preferably involves the generation and use of compensation light/sound beam as described in U.S. patent application Ser. No. 10/358,987, Publication No. 20040149940 and U.S. Pat. No. 5,834,877. This can be done using the existing assemblies 20, 30, 40, 50.

The optical and ultrasonic assemblies 20, 30, 40, 50 (transducers) preferably share the same software algorithms for selecting the transmitter-receiver pairs, acquiring the receiver signal, and computing the web position. In the preferred embodiment, the only slight differences are in the low-level software routines that control the transducer hardware to accommodate differences in signal propagation-time across the gap between transmitter and receiver and to accommodate differences in the method used to control the amplitude of the transmitted signals.

In the presently preferred embodiment, the two six-conductor cables that would ordinarily be used to connect the two pairs of transducers to the system controller have been combined into a single cable containing twelve conductors. In other embodiments the four individual transducers could be combined into two dual-mode transducers (one optical-ultrasonic transmitter and one optical-ultrasonic receiver) that would use one six-conductor cable to connect to the system controller. The four individual electronic interface circuits would be merged into two circuits to eliminate redundancy and cost, and each would include an additional circuit to allow the system controller to select its operating mode (optical or ultrasonic).

One advantage of dual-mode transducers is that they would permit AccuWeb's Micro 1000 and Micro 4000 NET controllers to each control two Fusion detectors instead of only one. These controllers have provisions for connecting to only two edge detectors. The presently preferred embodiment of the system (i.e., having two independent detectors in one housing) uses both detector input channels, whereas the merged version would use only one detector input channel.

It is to be understood that a wide range of changes and modifications to the embodiments described above will be apparent to those skilled in the art and are contemplated. These changes and modifications include, but are not limited to, the various embodiments and alternatives disclosed in U.S. patent application Ser. No. 10/358,987, Publication No. 20040149940, U.S. Pat. No. 5,834,877, U.S. Pat. No. 5,274,573, and U.S. Pat. No. 5,072,414, all of which are incorporated by reference. It is therefore intended that the foregoing detailed description be regarded as illustrative rather than limiting, and that it be understood that it is the following claims, including all equivalents, that are intended to define the spirit and scope of the invention.

We claim:

1. A system for use in detecting the edge of a web of moving material, the system comprising;
   an optical source operative to transmit light;
   an optical receiver positioned to receive light transmitted by the optical source and operative to generate a first signal;
   an ultrasonic source operative to transmit sound;
   an ultrasonic receiver positioned to receive sound transmitted by the ultrasonic source and operative to generate a second signal; and
   a controller coupled with the optical source, the optical receiver, the ultrasonic source, and the ultrasonic receiver, the controller being operative to activate the optical source and the ultrasonic source and receive the first and second signals, the controller being further operative to select the optical source and receiver or the ultrasonic source and receiver for use in detecting the edge of a web of moving material based upon the first and second signals;
   wherein the optical source and the optical receiver are spatially separated and the ultrasonic source and the ultrasonic receiver are spatially separated such that a portion of a web can pass between the optical source and the optical receiver and between the ultrasonic source and the ultrasonic receiver.

2. The system of claim 1, wherein the optical source comprises a light emitting diode.

3. The system of claim 1, wherein the optical source is operative to transmit light in the infrared light range.

4. The system of claim 1, wherein the optical source is operative to transmit light at variable intensities.

5. The system of claim 1, wherein the optical receiver comprises a phototransistor.

6. The system of claim 1, wherein the optical receiver comprises a photodiode.

7. The system of claim 1, wherein the ultrasonic transmitter comprises a sound conducting plate.

8. The system of claim 1, wherein the ultrasonic transmitter comprises a piezoelectric ceramic element.

9. The system of claim 1, wherein the ultrasonic receiver comprises a piezoelectric ceramic element.

10. The system of claim 1, further comprising a U-shaped housing having an upper arm and a lower arm, wherein the optical source is disposed in either the upper arm or the lower arm and optical receiver is disposed in the opposite arm and wherein the ultrasonic source is disposed in either the upper arm or the lower arm and ultrasonic receiver is disposed in the opposite arm.

11. The system of claim 1, further comprising a second optical source and a second optical receiver that are operative to generate a compensation light beam.

12. The system of claim 1, further comprising a second ultrasonic source and a second ultrasonic receiver that are operative to generate a compensation sound beam.

13. The system of claim 1, further comprising a web mover coupled with the controller.

14. A system for use in detecting the edge of a web of moving material, the system comprising;
   a plurality of optical sources that operative to transmit light;
   a plurality of optical receivers that are operative to receive light;
   a plurality of ultrasonic sources operative to transmit sound;
   a plurality of ultrasonic receivers operative to receive sound;
   a controller coupled with the plurality of optical sources, the plurality of optical receivers, the plurality of ultrasonic sources, and the plurality of ultrasonic receivers, the controller being operative to measure the amount of light received by one or more of the plurality of optical receivers, measure the amount of sound received by one or more of the plurality of ultrasonic receivers, and select the plurality of optical sources and receivers or the plurality of ultrasonic sources and receivers for use in detecting the edge of a web of moving material based upon the light and sound measurements.

15. The system of claim 14, wherein each of the plurality of optical sources comprises a light emitting diode.

16. The system of claim 14, wherein each of the plurality of optical sources is operative to transmit light in the infrared light range.

17. The system of claim 14, wherein each of the plurality of optical sources is operative to transmit light at variable intensities.

18. The system of claim 14, wherein each of the plurality of optical receivers comprises a phototransistor.

19. The system of claim 14, wherein each of the plurality of optical receivers comprises a photodiode.

20. The system of claim 14, wherein each of the plurality of ultrasonic transmitters comprises a sound conducting plate.

21. The system of claim 14, wherein each of the plurality of ultrasonic transmitters comprises a piezoelectric ceramic element.

22. The system of claim 14, wherein each of the plurality of ultrasonic receivers comprises a piezoelectric ceramic element.

23. The system of claim 14, wherein the plurality of optical sources are arranged in a staggered pattern.

24. The system of claim 14, wherein the plurality of optical sources are arranged in two substantially parallel rows.

25. The system of claim 14, wherein the plurality of optical receivers are arranged in a staggered pattern.

26. The system of claim 14, wherein the plurality of optical receivers are arranged in two substantially parallel rows.

27. The system of claim 14, wherein the plurality of ultrasonic sources are arranged in a staggered pattern.

28. The system of claim 14, wherein the plurality of ultrasonic sources are arranged in two substantially parallel rows.

29. The system of claim 14, wherein the plurality of ultrasonic receivers are arranged in a staggered pattern.

30. The system of claim 14, wherein the plurality of ultrasonic receivers are arranged in two substantially parallel rows.

31. The system of claim 14, wherein one of the plurality of optical sources is operative to generate a compensation beam of light.

32. The system of claim 14, wherein one of the plurality of ultrasonic sources is operative to generate a compensation beam of light.

33. The system of claim 14, wherein the controller is operative to sequentially activate the plurality of optical sources and optical receivers so that only a single optical source and a single optical receiver are active at a time.

34. The system of claim 14, wherein the controller is operative to sequentially activate the plurality of ultrasonic sources and ultrasonic receivers so that only a single ultrasonic source and a single ultrasonic receiver are active at a time.

35. The system of claim 14, further comprising a web mover coupled with the controller.

36. The system of claim 14, further comprising a U-shaped housing having an upper arm and a lower arm, wherein the plurality of optical sources are disposed in either the upper arm or the lower arm and plurality of optical receivers are disposed in the opposite arm and wherein the plurality of ultrasonic sources are disposed in either the upper arm or the lower arm and plurality of ultrasonic receivers are disposed in the opposite arm.

37. The system of claim 14, wherein the plurality of optical sources and the plurality of optical receivers are spatially separated and the plurality of ultrasonic sources and the plurality of ultrasonic receivers are spatially separated such that a portion of a web can pass between the plurality of optical sources and the plurality of optical receivers and between the plurality of ultrasonic sources and the plurality of ultrasonic receivers.

38. A method for detecting the edge of a web of moving material, the method comprising;
   (a) transmitting light using an optical source;
   (b) receiving light transmitted in (a) using an optical receiver;
   (c) determining the amount of light received in (b);
   (d) transmitting sound using an ultrasonic source;
   (e) receiving sound transmitted in (d);
   (f) determining the amount of sound received in (e); and
   (g) selecting the optical source and receiver or the ultrasonic source and receiver for use in detecting the edge of a web of moving material based upon the determinations made in (c) and (f).

39. The method of claim 38, further comprising the act of placing the web between the optical source and the optical receiver prior to (a).

40. The method of claim 38, further comprising the act of placing the web between the ultrasonic source and the ultrasonic receiver prior to (d).

41. The method of claim 38, wherein (a) comprises transmitting light using a light emitting diode.

42. The method of claim 38, wherein (b) comprises receiving light using a phototransistor.

43. The method of claim 38, wherein (b) comprises receiving light using a photodiode.

44. The method of claim 38, wherein (d) comprises transmitting sound using a piezoelectric ceramic element.

45. The method of claim 38, wherein (e) comprises receiving sound using a piezoelectric ceramic element.

46. The method of claim 38, further comprising the act of determining the position of the edge of the web using either the optical source and the optical receiver or the ultrasonic source and the ultrasonic receiver.

47. The method of claim 38, further comprising the act of generating a compensation light beam for use in determining the position of the edge of the web.

48. The method of claim 38, further comprising the act of generating a compensation sound beam for use in determining the position of the edge of the web.

* * * * *

UNITED STATES PATENT AND TRADEMARK OFFICE
CERTIFICATE OF CORRECTION

| | | |
|---|---|---|
| PATENT NO. | : 7,372,061 B2 | Page 1 of 1 |
| APPLICATION NO. | : 11/406048 | |
| DATED | : May 13, 2008 | |
| INVENTOR(S) | : Buisker et al. | |

It is certified that error appears in the above-identified patent and that said Letters Patent is hereby corrected as shown below:

In column 9, claim 32, line 47, delete "light" and insert --ultrasound--.

Signed and Sealed this

Twelfth Day of October, 2010

David J. Kappos
*Director of the United States Patent and Trademark Office*